No. 675,973. Patented June 11, 1901.
F. F. RAYMOND, 2d.
PASTE POT OR JAR.
(Application filed Jan. 7, 1901.)

(No Model.)

WITNESSES
INVENTOR

UNITED STATES PATENT OFFICE.

FREEBORN F. RAYMOND, 2D, OF NEWTON, MASSACHUSETTS, ASSIGNOR TO THE CARTER'S INK COMPANY, OF BOSTON, MASSACHUSETTS.

PASTE POT OR JAR.

SPECIFICATION forming part of Letters Patent No. 675,973, dated June 11, 1901.

Application filed January 7, 1901. Serial No. 42,386. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Paste Pots or Jars, of which the following is a full, clear, and exact description, reference being had to the accompanying drawings, forming a part of this specification, in explaining its nature.

The invention relates to the paste pot or jar herein described, the same having a paste-holder and an interior evaporating water-chamber connected with the paste-holder and an exterior brush and water-holding chamber, which is independent of the interior evaporating water-chamber.

Figure 1:
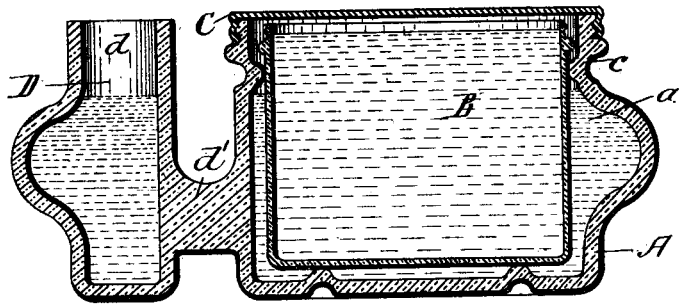
Figure 2:
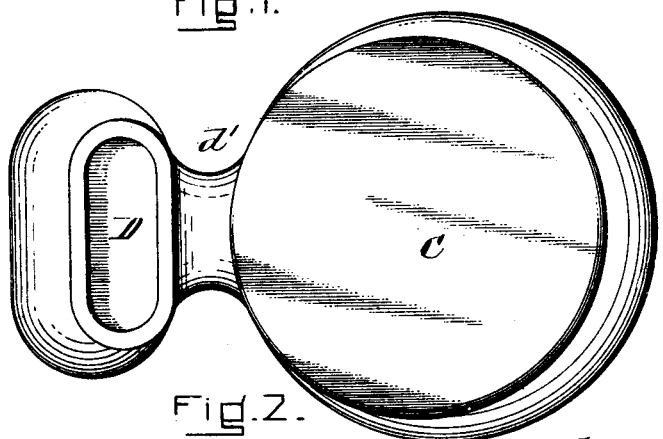
Figure 3:
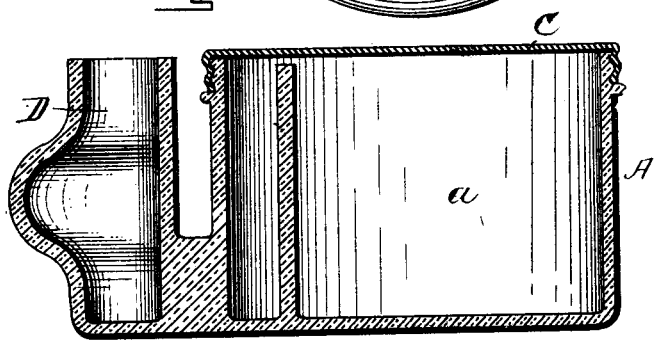
Figure 4:
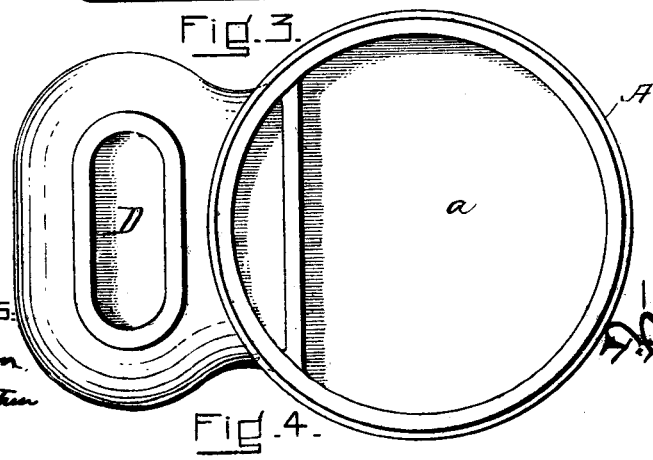

In the drawings, Figure 1 is a view in vertical central section of a paste pot or jar having the features of my invention. Fig. 2 is a view in plan thereof. Fig. 3 is a view in vertical central section of a modified form of the invention. Fig. 4 is a view in plan thereof with the cover removed.

Referring to the drawings, A represents the paste pot or jar, *a* the interior evaporating water-chamber therein, and B the paste-holder, which may be removable or may be fixed. I have represented the paste-holder as contained in the chamber *a* in a manner to be surrounded by the water therein; but this arrangement is not necessary. This water-chamber and paste-holder are covered by the cap C, applied to the wall *c*. Beyond the wall *c* is the brush-holding and water chamber D, which has the opening *d* at its top for receiving the brush and which is entirely separated from the water-chamber *a* by the partition *d'*. This provides the paste pot or jar with an evaporating water-chamber, which is used solely for providing moisture for softening the surface of the paste in the paste-holder, and an independent water-holding chamber used solely for receiving and holding the paste-brush and for moistening or wetting the brush. I do not confine myself to the shape or location of these individual chambers, and in the drawings I have shown two arrangements of the evaporating-chamber, one which entirely surrounds the removable paste-holder (see Fig. 1) and one that is at one side of a fixed paste-pot. (See Figs. 3 and 4.) There is an advantage in separating the two chambers, which arises from the fact that the water of the evaporation-chamber not being used by the brush will be cleaner and last longer than where the evaporation-chamber or a part of it is used for the brush. Another advantage arises because the evaporation-chamber can be made narrower, as represented in Fig. 1, and a large part of the paste-pot used for holding paste, while the water-holding chamber for the brush may be of any size and of any desired depth and may be replenished at will without affecting the water of the evaporating-chamber.

Having thus fully described my invention, I claim and desire to secure by Letters Patent of the United States—

A paste pot or jar having a water-evaporating chamber, a paste-holder communicating with said chamber, a cap covering both of said chambers, and an independent brush-holding water-chamber, the wall separating said paste-holder and said water-evaporating chamber being lower than the height of the wall receiving said cap, whereby said paste-holder and said water-evaporating chamber will connect as described.

FREEBORN F. RAYMOND, 2D.

In presence of—
J. M. DOLAN,
SAUL SIPPERSTEIN.